May 1, 1956     B. M. THOMAS     2,743,444
NAIL DRIVER
Filed Nov. 14, 1955
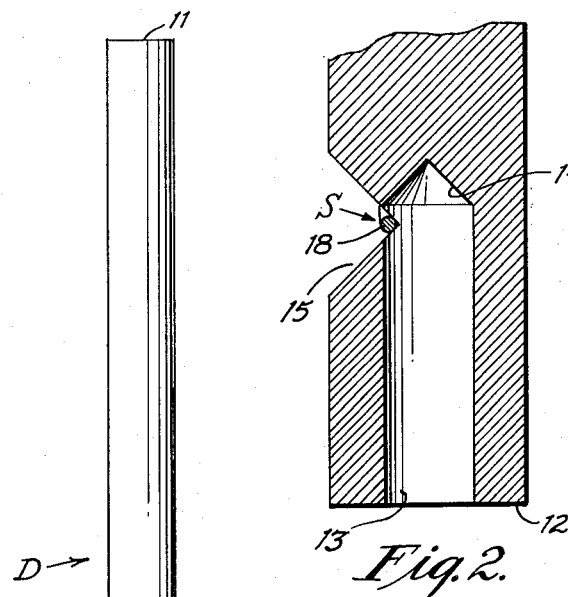
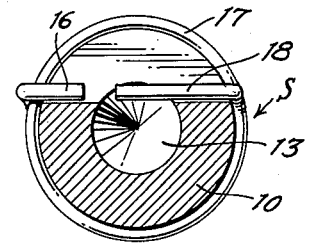
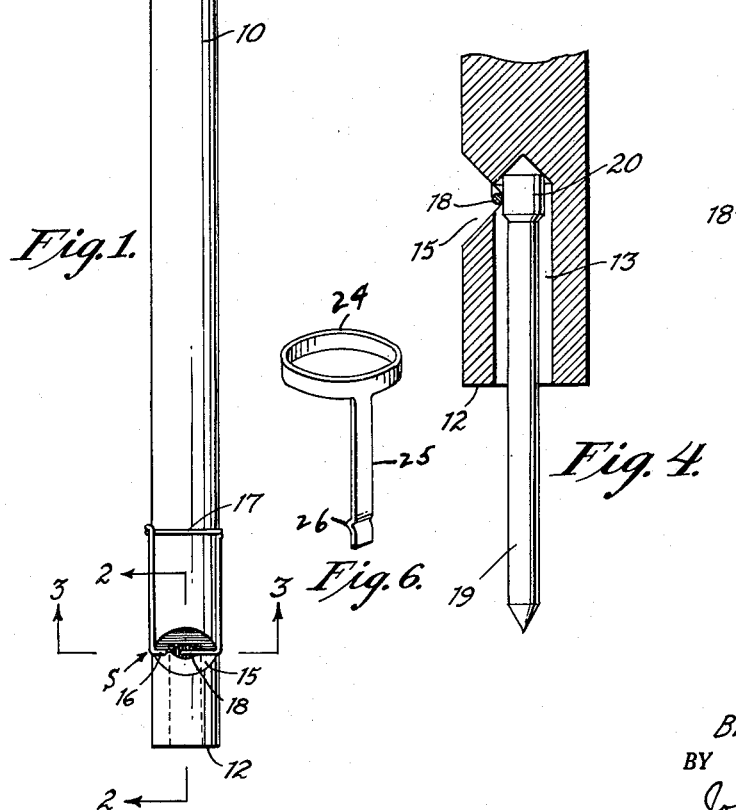
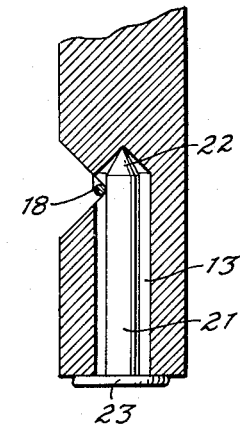
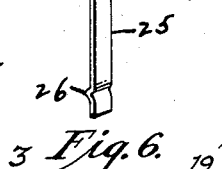
INVENTOR.
BERTRAM M. THOMAS
BY
John A. Robertson
ATTORNEY.

United States Patent Office 2,743,444
Patented May 1, 1956

2,743,444

NAIL DRIVER

Bertram M. Thomas, Maple Shade, N. J.

Application November 14, 1955, Serial No. 546,389

3 Claims. (Cl. 1—47)

The present invention relates to a so-called "nail driver" or "nail set" and is concerned primarily with a novel tool so designed and arranged as to be readily usable under difficult conditions with a maximum convenience.

At the present time, carpenters and other artisans engaged in constructional work requiring the driving of nails are often confronted with situations in which nails must be driven in places which are inaccessible and can be reached only with great difficulty. As an example, a nail must often be driven in close to a corner.

With the foregoing conditions in mind, the present invention has in view as its foremost objective the provision of a nail driver that may be employed to drive nails in any location which can be reached by the nail driver.

More in detail, the invention has as an object the provision of a nail driver of the character indicated which consists, essentially, of a metallic cylindrical body having opposite flat ends with a cylindrical bore entering into the body from one of the flat ends. This bore or socket is intended to receive the upper portion of a nail which is to be driven.

In some instances, it might be possible to start a nail in the usual way by applying a few light taps thereto. However, there are many places which are so hard to get at as to render such initial setting extremely difficult, if not impossible. Thus, another highly important object of the invention is to provide a nail set of the type noted with means for detachably holding a nail therein. Thus, a nail may be introduced into the driver first, whereupon the tool is then manipulated so as to apply the point of the nail where it is to be driven.

Another somewhat more detailed object of the invention is to provide, in a nail driver of the character indicated, a cylindrical body having a cylindrical bore or socket at one end which is coaxial with the outer surface of the body being formed with a transverse kerf or notch which opens into and communicates with the bore. A wire spring is anchored in this notch and has one end extending partially into the bore whereby it functions as a yieldable detent for securing a nail in position in the bore.

With a nail driver having a yieldable detent of the character aforesaid, it is possible and entirely practical to position a short flat-headed nail in the bore with the flat head of the nail engaging the flat head of the tool. The tool is thus adapted to complete or finish the nail driving operation by driving a nail completely home, so that its head is flush with the surface in which it is driven.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a nail driver or set which consists, essentially, of a metallic cylindrical body having a flat end with a cylindrical bore socket entering the body from said end and coaxial with the body. The outer surface of the body is formed with a transverse notch that opens into the bore and anchored in this notch is a wire spring having one end extending into the bore where it functions as a yieldable detent for engaging a nail and holding it in position in the socket.

For a full and more complete understanding of the invention, reference may be had to the following description and accompanying drawing wherein:

Figure 1 is a view in side elevation of a nail driver designed in accordance with the precepts of this invention.

Figure 2 is an enlarged detailed section of the socket end of the tool and is taken about on the plane represented by the line 2—2 of Figure 1.

Figure 3 is a transverse section taken about on the plane represented by the line 3—3 of Figure 1.

Figure 4 is a view similar to Figure 2 depicting a nail as held in position in the socket.

Figure 5 is a view similar to Figure 4 showing a short flat-headed nail held in position with the pointed end innermost whereby the tool is adapted for finishing the driving of nails; and Figure 6 is a perspective view of a modified form of spring.

Referring now to the drawing wherein like reference characters denote corresponding parts and first more particularly to Figure 1, a nail driver that is designed in accordance with the teachings of this invention is therein illustrated and referred to in its entirety by the reference character D.

The nail driver D comprises a cylindrical body 10 which may be made from any appropriate metal although the invention has particularly in mind the use of a good tool steel. The body 10 has opposite ends 11 and 12 which preferably are flat to permit the cutting of several of these bodies from a long strip of stock.

Entering into the body 10 from the end 12 is a bore or socket 13 which preferably is cylindrical. This bore may terminate in a conical end, as indicated at 14, to facilitate formation of the bore 13. Adjacent to the inner end of the socket 13, the body 10 is formed with a transverse kerf or notch 15 which communicates with the bore 13; that is the notch 15 opens into the bore 13 adjacent to the upper or inner end of the latter. A wire spring is referred to in its entirety by the reference character S. The spring S has a straight end portion 16 which is received in the apex of one side of the notch 15. From this straight end 16, the spring S includes a coiled portion 17 comprising substantially one and one-half turns. The other end of the spring S is also formed as a straight end portion 18 which extends across the other side of the notch 15 and into the bore 13. It is this straight end 18 that is adapted to function as a detent to yieldably hold a nail in position in the socket by engagement therewith under spring pressure.

A nail which is to be driven is shown at 19 in Figure 4. This nail is of the tenpenny type although the invention is not to be limited in this respect. The nail 19 has a head 20 which is at the inner end of the socket. As this head 20 is engaged by the spring end 18, the nail is yieldably held in position so that it may be applied wherever it is needed by appropriate manipulation of the tool D.

Figure 5 shows a flat-headed nail 21 having a pointed end 22 and a flat head 23 positioned in the socket 13 whereby the tool D is adapted to finish the driving of nails.

It is believed that the tool of this invention is capable of performing any of the functions required of a nail driver or set and is yet of such extreme simplicity as to render it susceptible of manufacture at minimum cost.

The spring and its anchorage are also the epitome of simplicity and yet a sure spring anchorage is afforded.

Figure 6 discloses a modified form of spring comprising a ring 24 which encircles the main body portion 10 and which ring has integrally joined thereto a tongue 25 formed with a bead 26 which is received in the notch 15 so as to engage the nail 19.

While preferred specific embodiments of the invention are hereinbefore set forth, it is to be clearly understood that the invention is not to be limited to the exact constructions, proportions, and devices illustrated and described, because various modifications of these details may be provided in putting the invention into practice within the purview of the appended claims.

What is claimed is:

1. A nail set comprising a cylindrical body having a bore opening into one end thereof and coaxial therewith with the body being formed with a transverse notch communicating with said bore, and a wire spring having one end anchored in said notch and the other end formed as a straight piece extending across said notch and into said bore whereby it is adapted to function as a yieldable detent.

2. A nail driver comprising a metallic cylindrical body having a flat end with a cylindrical bore opening into said body from the said flat end and coaxial with the body, said body being formed with a transverse angularly-shaped notch opening into said bore, and a wire spring coiled about said body and having one straight end anchored in one side of said notch and another straight end extending across the other side of said notch and into said bore where it is adapted to function as a yieldable detent.

3. A nail driver comprising a steel cylindrical body having opposite flat ends with a cylindrical bore entering into said body from one of said flat ends and coaxial with said body, said body being formed on its outer surface with a transverse angularly-shaped notch that forms an opening communicating with said bore leaving the sides of said notch on opposite sides of said opening, and a wire spring coiled about said body in snug engagement therewith and having a straight end anchored in one side of said notch and another straight end extending across the other side of said notch and transversely across said bore at one side thereof where it constitutes a yieldable detent adapted to engage a nail in position in said socket.

<center>No references cited.</center>